US012512036B2

(12) United States Patent
Li

(10) Patent No.: US 12,512,036 B2
(45) Date of Patent: Dec. 30, 2025

(54) DISPLAY COMPENSATION METHOD OF A DISPLAY PANEL AND A DISPLAY PANEL

(71) Applicant: Guangzhou China Star Optoelectronics Semiconductor Display Technology Co., Ltd., Guangdong (CN)

(72) Inventor: Jinxing Li, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/644,148

(22) Filed: Apr. 24, 2024

(65) Prior Publication Data

US 2025/0279024 A1 Sep. 4, 2025

Related U.S. Application Data

(63) Continuation of application No. PCT/CN2024/082339, filed on Mar. 19, 2024.

(30) Foreign Application Priority Data

Mar. 4, 2024 (CN) ......................... 202410244572.8

(51) Int. Cl.
*G09G 3/20* (2006.01)

(52) U.S. Cl.
CPC ....... *G09G 3/2074* (2013.01); *G09G 2310/08* (2013.01); *G09G 2320/0271* (2013.01)

(58) Field of Classification Search
CPC ... G09G 2320/0252; G09G 2320/0285; G09G 2320/0233; G09G 2320/041;
(Continued)

(56) References Cited

U.S. PATENT DOCUMENTS

2018/0218662 A1* 8/2018 Hu ........................... G09G 3/36
2022/0180793 A1* 6/2022 Wang .................. G09G 3/3607
(Continued)

FOREIGN PATENT DOCUMENTS

CN 111833827 A 10/2020
CN 111862889 A 10/2020
(Continued)

OTHER PUBLICATIONS

International Search Report in International application No. PCT/CN2024/082339, mailed on Dec. 3, 2024.
Written Opinion of the International Search Authority in International application No. PCT/CN2024/082339, mailed on Dec. 3, 2024.

*Primary Examiner* — Dong Hui Liang
(74) *Attorney, Agent, or Firm* — PV IP PC; Christopher S. Ruprecht; Wei Te Chung

(57) ABSTRACT

A display compensation method of a display panel and a display panel are provided. The display panel includes a first partition and a second partition spaced apart. The first partition includes a plurality of first sub-pixels, the second partition includes a plurality of second sub-pixels, and the display compensation method includes: obtaining a first overdrive grayscale corresponding to a grayscale to be displayed of each of the plurality of first sub-pixels in a current frame image, and a second overdrive grayscale corresponding to a grayscale to be displayed of each of the plurality of second sub-pixels; obtaining a first compensating grayscale based on the first overdrive grayscale; obtaining the second compensating grayscale based on the second overdrive grayscale; and controlling the display panel to complete display compensation of the current frame image based on the first compensating grayscale and the second compensating grayscale.

20 Claims, 3 Drawing Sheets

(58) Field of Classification Search
CPC ... G09G 2320/0673; G09G 2320/0271; G09G 2320/0276; G09G 2320/0242; G09G 2320/0223; G09G 2340/16; G09G 3/3648; G09G 3/3607; G09G 3/36; G09G 3/3614; G09G 3/20; G09G 3/3688; G09G 3/2011; G09G 3/3696; G09G 3/3233; G09G 3/3258; G09G 3/2007; G09G 3/3685; G09G 2310/027; G09G 2310/08; G09G 2360/18; G09G 2360/16; G09G 2300/0426; G09G 5/06
See application file for complete search history.

(56) References Cited

U.S. PATENT DOCUMENTS

| | | | | |
|---|---|---|---|---|
| 2023/0071402 A1* | 3/2023 | Xiao | .................... | G09G 3/2096 |
| 2023/0186815 A1* | 6/2023 | Gao | ..................... | G09G 3/2003 345/690 |

FOREIGN PATENT DOCUMENTS

| | | | |
|---|---|---|---|
| CN | 112581919 | A | 3/2021 |
| CN | 117524060 | A | 2/2024 |
| KR | 20190056659 | A | 5/2019 |

* cited by examiner

DISPLAY COMPENSATION METHOD OF A DISPLAY PANEL AND A DISPLAY PANEL

CROSS REFERENCE TO RELATED APPLICATIONS

This application is a continuation of International Application No. PCT/CN2024/082339, filed on Mar. 19, 2024, which claims priority to Chinese Patent Application No. 202410244572.8, filed in the Chinese Patent Office on Mar. 4, 2024, and entitled "Display Compensation Method of a Display Panel and a Display Panel", the contents of which are incorporated herein by reference in their entireties.

TECHNICAL FIELD

The present disclosure relates to but is not limited to display technologies, and in particular, to a display compensation method of a display panel and a display panel.

BACKGROUND

Affected by factors such as in-plane loading, insufficient charging capacity of some sub-pixels may occur in a display panel, resulting in display problems such as horizontal stripe and color deviation. In order to improve the display effect, the method of line overdrive (line OD or LOD for short) compensation can generally be used to perform grayscale compensation for the sub-pixels, so that the actual display effect reaches that of the ideal charging state.

However, the line overdrive compensation generally can only achieve full-screen positive compensation or full-screen negative compensation under the same screen image. In some special scenarios, such as at a certain refresh rate, the charging states of sub-pixels close to a source driver module and of sub-pixels away from the source driver module of the display panel are different, the line overdrive compensation can only take into account the improvement of horizontal stripe at one of the two sides, and the debugging effect of full-screen horizontal stripe is still not good.

SUMMARY

Embodiments of the present disclosure provide a display compensation method of a display panel and a display panel, so as to address the problem of horizontal stripe of the display panel and improve the display effect.

Technical solutions: an embodiment of the present disclosure provides a display compensation method of a display panel, the display panel includes at least one first partition and at least one second partition spaced apart, each of the at least one first partition includes a plurality of first sub-pixels, each of the at least one second partition includes a plurality of second sub-pixels, and the display compensation method includes:

- obtaining a first overdrive grayscale corresponding to a grayscale to be displayed of each of the plurality of first sub-pixels in a current frame image, and a second overdrive grayscale corresponding to a grayscale to be displayed of each of the plurality of second sub-pixels;
- obtaining a first compensating grayscale based on the first overdrive grayscale, and the first compensating grayscale is less than or equal to the grayscale to be displayed corresponding to the first overdrive grayscale;
- obtaining a second compensating grayscale based on the second overdrive grayscale, and the second compensating grayscale is greater than or equal to the grayscale to be displayed corresponding to the second overdrive grayscale;
- controlling the display panel to complete display compensation of the current frame image based on the first compensating grayscale and the second compensating grayscale.

According to the display compensation method of the display panel provided by the above embodiment of the present disclosure, an embodiment of the present disclosure further provides a display panel, the display panel includes at least one first partition, each of the at least one first partition includes a plurality of first sub-pixels, a charging state of each of the plurality of first sub-pixels at a target refresh rate is a first state, and the first state is configured such that a relationship between an actual brightness $L_1$ and a standard brightness $L_0$ satisfies $L_0<L_1$; and the display panel includes:

- a timing controller, the timing controller includes a storage unit, the storage unit is configured to store a gain compensation table, the gain compensation table includes a first gain value Gain corresponding to each of the at least one first partition, and the first gain value $Gain_1$ satisfies: $Gain_1<0$.

BRIEF DESCRIPTION OF THE DRAWINGS

In order to illustrate the technical solutions in the embodiments of the present disclosure more clearly, drawings that are required to be used in the description of the embodiments will be briefly introduced below. Apparently, the drawings in the following description are merely some embodiments of the present disclosure. For those of ordinary skill in the art, other drawings can be obtained based on these drawings without making creative efforts.

REFERENCE NUMERALS

Figure 1:
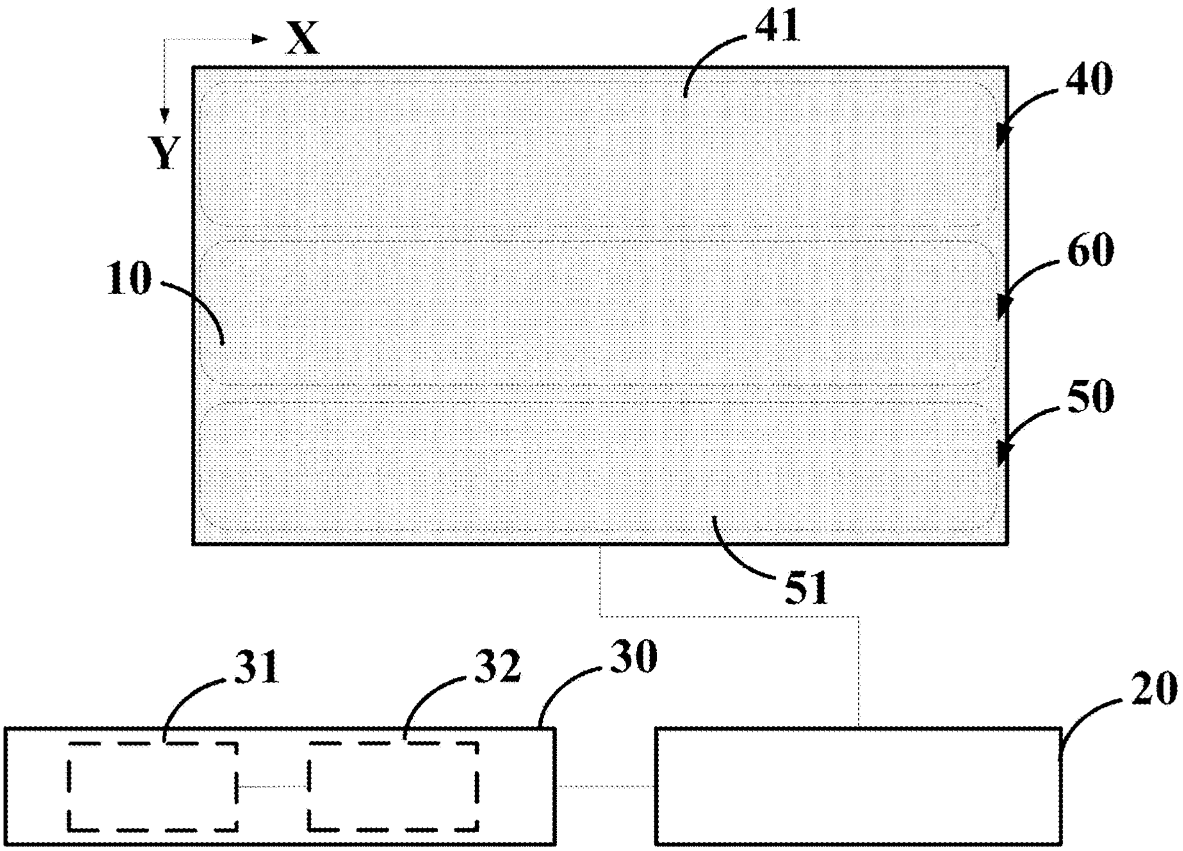
FIG. 1 is an exemplary schematic diagram of a structure of a display panel in an embodiment of the present disclosure.

10—subpixel; 20—source driver; 30—timing controller; 31—storage unit; 32—display compensation device; 321—first obtaining module; 322—second obtaining module; 323—third obtaining module; 324—display driver module; 40—first partition; 41—first sub-pixel; 50—second partition; 51—second sub-pixel; 60—third partition.

DETAILED DESCRIPTION

The technical solutions in the embodiments of the present disclosure will be clearly and completely described below with reference to the accompanying drawings in the embodiments of the present disclosure. It is apparent that the embodiments described are only part of the embodiments of the present disclosure, but not all the embodiments of the present disclosure. Based on the embodiments in the present disclosure, all other embodiments obtained by those skilled in the art without making creative efforts fall within the scope of protection of the present disclosure.

In the description of the present disclosure, it should be understood that the orientation or positional relationship indicated by terms such as "upper", "lower", "front", "back", "left", "right", "top", "bottom", "inside", "outside" is based on the orientation or positional relationship shown in the accompanying drawings. It is only for the convenience of describing the present disclosure and simplifying the description, and it does not indicate or imply that the device or element referred to must have a specific orientation, be constructed and operated in a specific orientation, therefore, it should not be interpreted as limitations of the present disclosure. In addition, the terms "first" and "second" are only used for descriptive purposes, and cannot be interpreted as indicating or implying the relative importance or implicitly indicating the quantity of indicated technical features. Therefore, the features defined as the "first" and "second" may explicitly or implicitly include one or more features. In the description of the present disclosure, "a plurality of" means two or more than two, and at least one means one, two, or more than two, unless otherwise clearly and specifically limited.

Embodiments of the present disclosure provide a display compensation method of a display panel and a display panel, which can address the problem of horizontal stripe of the display panel and improve the display effect.

An embodiment of the present disclosure provides a display compensation method of a display panel, the display panel includes at least one first partition and at least one second partition spaced apart, each of the at least one first partition includes a plurality of first sub-pixels, each of the at least one second partition includes a plurality of second sub-pixels, and the display compensation method includes:

obtaining a first overdrive grayscale corresponding to a grayscale to be displayed of each of the plurality of first sub-pixels in a current frame image, and a second overdrive grayscale corresponding to a grayscale to be displayed of each of the plurality of second sub-pixels;

obtaining a first compensating grayscale based on the first overdrive grayscale, and the first compensating grayscale is less than or equal to the grayscale to be displayed corresponding to the first overdrive grayscale;

obtaining a second compensating grayscale based on the second overdrive grayscale, and the second compensating grayscale is greater than or equal to the grayscale to be displayed corresponding to the second overdrive grayscale; and controlling the display panel to complete display compensation of the current frame image based on the first compensating grayscale and the second compensating grayscale.

In some embodiments, a charging state of each of the plurality of first sub-pixels at a target refresh rate is a first state, and the first state is configured such that a relationship between an actual brightness $L_1$ and a standard brightness $L_0$ satisfies $L_0<L_1$; and a charging state of each of the plurality of second sub-pixels at the target refresh rate is a second state, and the second state is configured such that the relationship between the actual brightness $L_1$ and the standard brightness $L_0$ satisfies $L_1<L_0$.

In some embodiments, obtaining the first compensating grayscale and the second compensating grayscale includes:

performing negative compensation on the first overdrive grayscale to obtain the first compensating grayscale; and performing positive compensation on the second overdrive grayscale to obtain the second compensating grayscale.

In some embodiments, performing negative compensation on the first overdrive grayscale to obtain the first compensating grayscale includes:

obtaining a gain compensation table of the display panel, the gain compensation table includes a first gain value $Gain_1$ corresponding to each of the at least one first partition, and the first gain value Gain satisfies: $Gain_1<0$; and obtaining the first compensating grayscale based on the grayscale to be displayed of each of the plurality of first sub-pixels, the first overdrive grayscale, and the first gain value $Gain_1$.

In some embodiments, the gain compensation table further includes a second gain value $Gain_2$ corresponding to each of the at least one second partition, and the second gain value $Gain_2$ satisfies: $0<Gain_2$; and performing positive compensation on the second overdrive grayscale to obtain the second compensating grayscale includes:

obtaining the second compensating grayscale based on the grayscale to be displayed of each of the plurality of second sub-pixels, the second overdrive grayscale, and the second gain value $Gain_2$.

In some embodiments, obtaining the first overdrive grayscale and the second overdrive grayscale includes:

obtaining a line overdrive compensation table of the display panel at the target refresh rate;

obtaining the first overdrive grayscale from the line overdrive compensation table based on the grayscale to be displayed of each of the plurality of first sub-pixels in the current frame image and a grayscale to be displayed of each sub-pixel in a previous row of the plurality of first sub-pixels; and obtaining the second overdrive grayscale from the line overdrive compensation table based on the grayscale to be displayed of each of the plurality of second sub-pixels in the current frame image and a grayscale to be displayed of each sub-pixel in a previous row of the plurality of second sub-pixels.

An embodiment of the present disclosure further provides a display panel, the display panel comprises at least one first partition, each of the at least one first partition comprises a plurality of first sub-pixels, and a charging state of each of the plurality of first sub-pixels at a target refresh rate is a first state, and the first state is configured such that a relationship between an actual brightness $L_1$ and a standard brightness $L_0$ satisfies $L_0<L_1$; and the display panel includes:

a timing controller, the timing controller includes a storage unit, the storage unit is configured to store a gain compensation table, the gain compensation table comprises a first gain value Gain corresponding to each of the at least one first partition, and the first gain value $Gain_1$ satisfies: $Gain_1<0$.

In some embodiments, the first gain value $Gain_1$ satisfies: $-2 \le Gain_1<0$.

In some embodiments, the display panel further comprises at least one second partition spaced apart from the at least one first partition, each of the at least one second partition includes a plurality of second sub-pixels, a charging state of each of the plurality of second sub-pixels at the target refresh rate is a second state, and the second state is configured such that the relationship between actual brightness $L_1$ and standard brightness $L_0$ satisfies $L_1<L_0$; and the gain compensation table further includes a second gain value $Gain_2$ corresponding to each of the at least one second partition, and the second gain value $Gain_2$ satisfies: $0<Gain_2$.

In some embodiments, the second gain value $Gain_2$ satisfies: $0<Gain_2\leq 2$.

Beneficial Effects

In the display compensation method of a display panel in the embodiments of the present disclosure, the display panel includes at least one first partition and at least one second partition spaced apart, each of the at least one first partition includes a plurality of first sub-pixels, each of the at least one second partition includes a plurality of second sub-pixels, and the display compensation method includes: obtaining a first overdrive grayscale corresponding to a grayscale to be displayed of each of the plurality of first sub-pixels in a current frame image, and a second overdrive grayscale corresponding to a grayscale to be displayed of each of the plurality of second sub-pixels; obtaining a first compensating grayscale based on the first overdrive grayscale, and the first compensating grayscale is less than or equal to the grayscale to be displayed corresponding to the first overdrive grayscale; obtaining a second compensating grayscale based on the second overdrive grayscale, and the second compensating grayscale is greater than or equal to the grayscale to be displayed corresponding to the second overdrive grayscale; and controlling the display panel to complete display compensation of the current frame image based on the first compensating grayscale and the second compensating grayscale. The display compensation method of a display panel can perform overdrive compensation in different directions on the partitions of the first sub-pixels and the second sub-pixels with different charging states under the same screen image, so as to take into account the charging states of the full screen, and thus significantly alleviating the horizontal stripe and improving the display effect.

The embodiments of the present disclosure will be further described below in combination with the accompanying drawings and specific embodiments.

Figure 2:
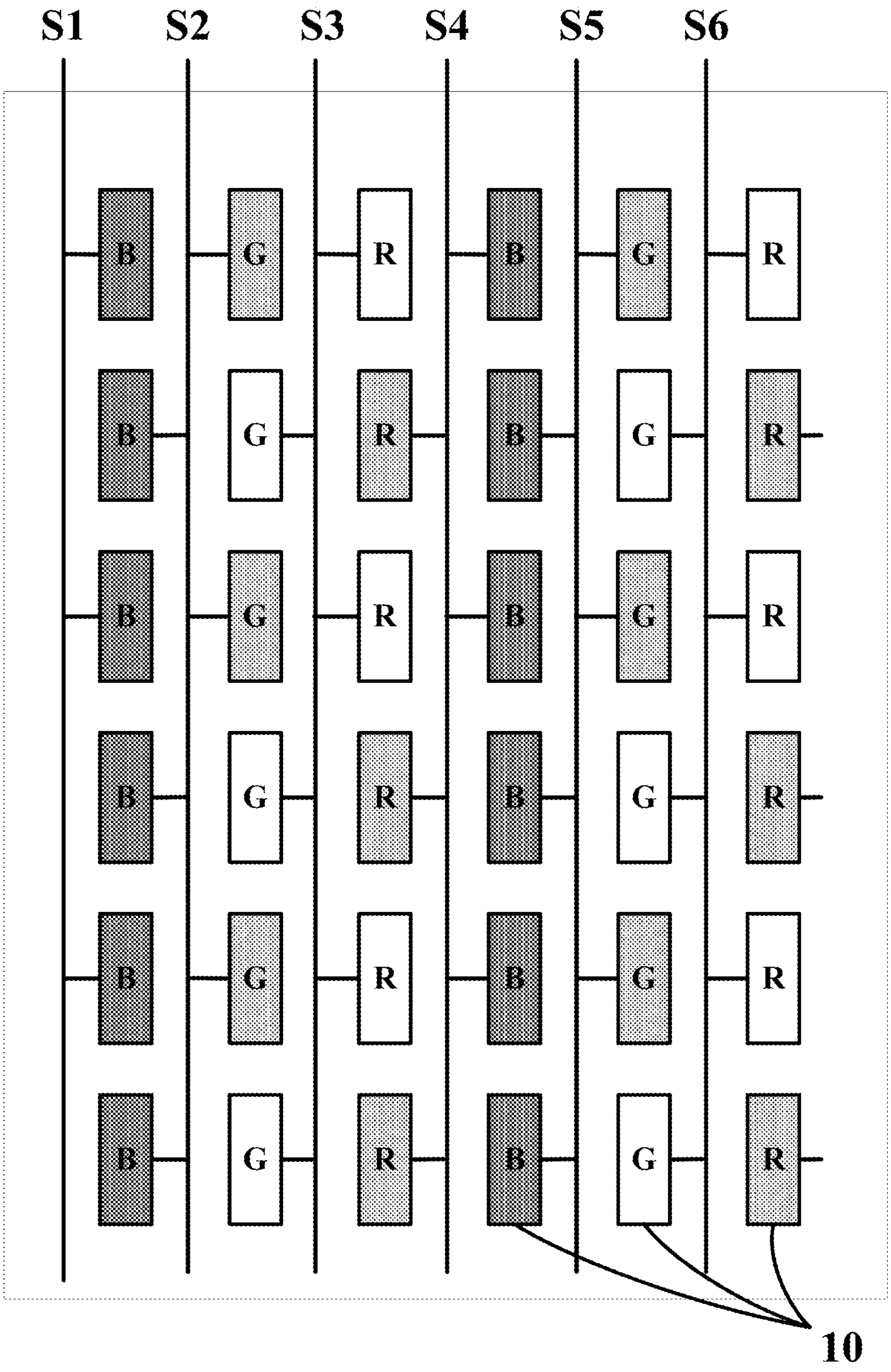
FIG. 2 is an exemplary schematic diagram of an arrangement structure of sub-pixels of a display panel in an embodiment of the present disclosure.

Referring to FIG. 1 and FIG. 2, FIG. 1 illustrates an exemplary structure of a display panel in an embodiment of the present disclosure, and FIG. 2 illustrates an exemplary arrangement structure of a display panel in an embodiment of the present disclosure. The display panel of the embodiments of the present disclosure may include a plurality of sub-pixels 10 disposed in an array, a source driver 20 and a timing controller 30. The source driver 20 is connected to the sub-pixels 10 so as to provide data signals to the sub-pixels 10. The timing controller 30 is connected to the source driver 20 so as to provide display data and corresponding time sequence to the source driver 20. The timing controller 30 may include a storage unit 31, and the storage unit 31 is configured to store relevant data of the compensation table. Taking a display panel with a flip architecture as an example, the plurality of sub-pixels 10 may include red sub-pixels R, green sub-pixels G and blue sub-pixels B, and the sub-pixels 10 in each column have the same color. The display panel further includes a plurality of data lines (such as columns S1 to S6), each of the data lines connects sub-pixels 10 of two different colors. When the display panel is displaying, the same data line provides data signals to the corresponding sub pixels 10 in a left-right and left-right manner. Taking displaying a screen image of (R96, G96, B0) as an example, the data signals provided by the data lines of columns S2, S4, and S5 jump between grayscale 0 and grayscale 96. In a case of no compensation, due to insufficient charging, the brightness of corresponding sub-pixels 10 displaying grayscale 96 becomes darker. The data signals provided by the data lines of columns S3 and S6 are grayscale 96 all along without any transition between grayscales, and therefore, there is no charging problem for corresponding sub-pixels 10, and the brightness of sub-pixels displaying grayscale 96 is normal brightness. This will result in that one row of the sub-pixels is bright and another row of the sub-pixels is dark when the display panel displaying the screen image of (R96, G96, B0), which will macroscopically appear as the problem of full-screen horizontal stripe. (R96, G96, B0) means that the grayscale of the red sub-pixel R is grayscale 96, the grayscale of the green sub-pixel G is grayscale 96, and the grayscale of the blue sub-pixel B is grayscale 0.

In order to improve display problems such as horizontal stripe and color deviation, LOD compensation technology can generally be used to perform grayscale compensation on the sub-pixels 10. The LOD compensation technology mainly increases or decreases the data voltage applied to the sub-pixel 10 to make the actual display effect of the sub-pixel 10 can achieve that in the ideal charging state. However, commonly used LOD compensation technology can generally only achieve full-screen positive compensation or full-screen negative compensation under the same screen image. For example, in a case of displaying the screen image of (R96, G96, B0), LOD compensation can only achieve full-screen negative compensation for blue sub-pixels B so as to reduce the charging capacity of each sub-pixel 10 and address the overcharging of the blue sub-pixels B.

However, the charging time of the sub-pixels 10 of the display panel are also different under different refresh rates. Affected by factors such as in-plane loading, at a certain refresh rate (such as 120 Hz or 144 Hz), the display panel may have the problem that the charging states of the sub-pixels 10 close to the source driver 20 and of the sub-pixels 10 away from the source driver 20 are different. At this time, the commonly used LOD compensation technology can only take into account of the improvement of charging of one of the two sides, and the debugging effect of the full-screen horizontal stripe is still not good. In addition, the charging states of the full screen can also be adjusted to be consistent by adjusting the time sequence. However, this will not only increase the inter-chip difference between horizontal stripes, but also affect the schedule of adjusting the machine code, and thus affecting the entire production schedule of the entire product.

An embodiment of the present disclosure provides a display panel, by optimizing the value range of each gain value Gain of the compensation table in the storage unit 31, overdrive compensation in different directions can be implemented for sub-pixel partitions with different charging states in the same screen image, and thus taking into account the charging effect of the full screen, so as to significantly alleviate the horizontal stripe and improve the display effect.

Continuing to refer to FIG. 1, the display panel of the embodiment of the present disclosure may include a first partition 40. The first partition 40 includes a plurality of first sub-pixels 41. The charging state of each of the first sub-pixels 41 at the target refresh rate is the first state, and the first state is configured such that the relationship between the actual brightness $L_1$ and the standard brightness $L_0$ satisfies $L_0<L_1$. Exemplarily, the target refresh rate may be 120 Hz or 144 Hz. The storage unit 31 of the timing controller 30 is configured to store the gain compensation table. The gain compensation table includes the first gain value $Gain_1$ corresponding to each first partition 40, and the first gain value $Gain_1$ satisfies: $Gain_1<0$.

Specifically, the first gain value $Gain_1$ is configured to represent the grayscale compensation multiple of the corresponding first partition 40.

In some examples, the first gain value Gain may satisfy: $-2\leq Gain_1<0$. Exemplarily, the first gain value Gain is any one of or a range value between any two of −2, −1.9, −1.8, −1.7, −1.6, −1.5, −1.4, −1.3, −1.2, −1.1, −1.0, −0.9, −0.8, 0.7, −0.6, −0.5, −0.4, −0.3, −0.2, −0.1.

In some examples, the display panel may further include a second partition 50 spaced apart from the first partition 40, and the second partition 50 includes a plurality of second sub-pixels 51. The charging state of each of the second sub-pixels 51 at the target refresh rate is the second state, and the second state is configured such that the relationship between the actual brightness $L_1$ and the standard brightness $L_0$ satisfies $L_1<L_0$. The gain compensation table in the storage unit 31 further includes a second gain value $Gain_2$ corresponding to each second partition 50, and the second gain value $Gain_2$ satisfies: $0<Gain_2$.

Specifically, the second gain value $Gain_2$ is configured to represent the grayscale compensation multiple of the corresponding second partition 50.

In some examples, the second gain value $Gain_2$ may satisfy: $0<Gain_2\leq 2$. Exemplarily, the second gain value $Gain_2$ is any one of or a range value between any two of 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1.

It can be understood that the first sub-pixels 41 and the second sub-pixels 51 in the embodiment of the present disclosure are all sub-pixels 10, which are located in different partitions.

In some examples, the first partition 40 and the second partition 50 are spaced apart along the column direction Y of the display panel 10. The first partition 40 is close to the source driver 20, and the second partition 50 is away from the source driver 20. Then, the charging state of each of the first sub-pixels 41 at the target refresh rate is an overcharged state, and the charging state of each of the second sub-pixels 51 at the target refresh rate is an undercharged state. That is to say, the first partition 40 and the second partition 50 can be partitions with opposite charging states at the target refresh rate. Exemplarily, there may be a plurality of first partitions 40 and a plurality of second partitions 50, the plurality of first partitions 40 are arranged along the row direction X of the display panel 10, and the plurality of second partitions 50 are arranged along the row direction X of the display panel 10. It can be understood that along the column direction Y of the display panel 10, the overcharging extent of each of the first partitions 40 may be different, and the undercharging extent of each of the second partitions 50 may also be different.

In some examples, the display panel may further include a third partition 60, the third partition 60 is located between the first partition 40 and the second partition 50 along the column direction Y of the display panel. The charging state of each sub-pixel 10 in the third partition 60 at the target refresh rate may be a third state. The third state is configured such that the relationship between the actual brightness $L_1$ and the standard brightness $L_0$ satisfies $L_0=L_1$. That is to say, the charging state of each sub-pixel 10 in the partition 60 is a normal state at the target refresh rate. Exemplarily, the first partition 40, the second partition 50, and the third partition 60 may divide the display panel into 4×8 partitions.

It can be understood that each partition can be divided based on the actual charging state of each sub-pixel 10 on the display panel, which can be set according to requirements and actual conditions, and is not specifically limited in the embodiment of the present disclosure.

It can be understood that before the development of the display panel product, and when selecting the model of the timing controller (Tcon) 30, the display panel provided in the present embodiment can expand the value range of each gain value Gain in the compensation table in the storage unit 31 by changing the hardware compensation circuit in the timing controller 30. That is, $0\leq Gain\leq M$ is optimized to $-N\leq Gain\leq M$, wherein M and N are both positive numbers. In this way, by optimizing the value range of each gain value Gain, the gain value of each partition can be adjusted according to actual requirements when debugging the gain compensation table. Compared with the gain value with only positive values, the above method can better improve the situation in which the charging states of different partitions are different at the target refresh rate, and thus improving debugging efficiency and shortening the code debugging schedule. In addition, there is no need to introduce a new IP (Intellectual Property, that is, a general term for integrated circuit cores with intellectual property cores) module in the timing controller 30, which will not affect other parameters, while changes in the value range of the gain value Gain will not increase the amount of data storage, so that the overall cost of the product is not affected.

The timing controller 30 of the embodiment of the present disclosure may further be provided with a display compensation device 32, so as to compensate the display screen image by performing the display compensation method of the embodiment of the present disclosure. The display compensation method of the display panel according to the embodiment of the present disclosure will be described below with reference to the accompanying drawings.

Figure 3:
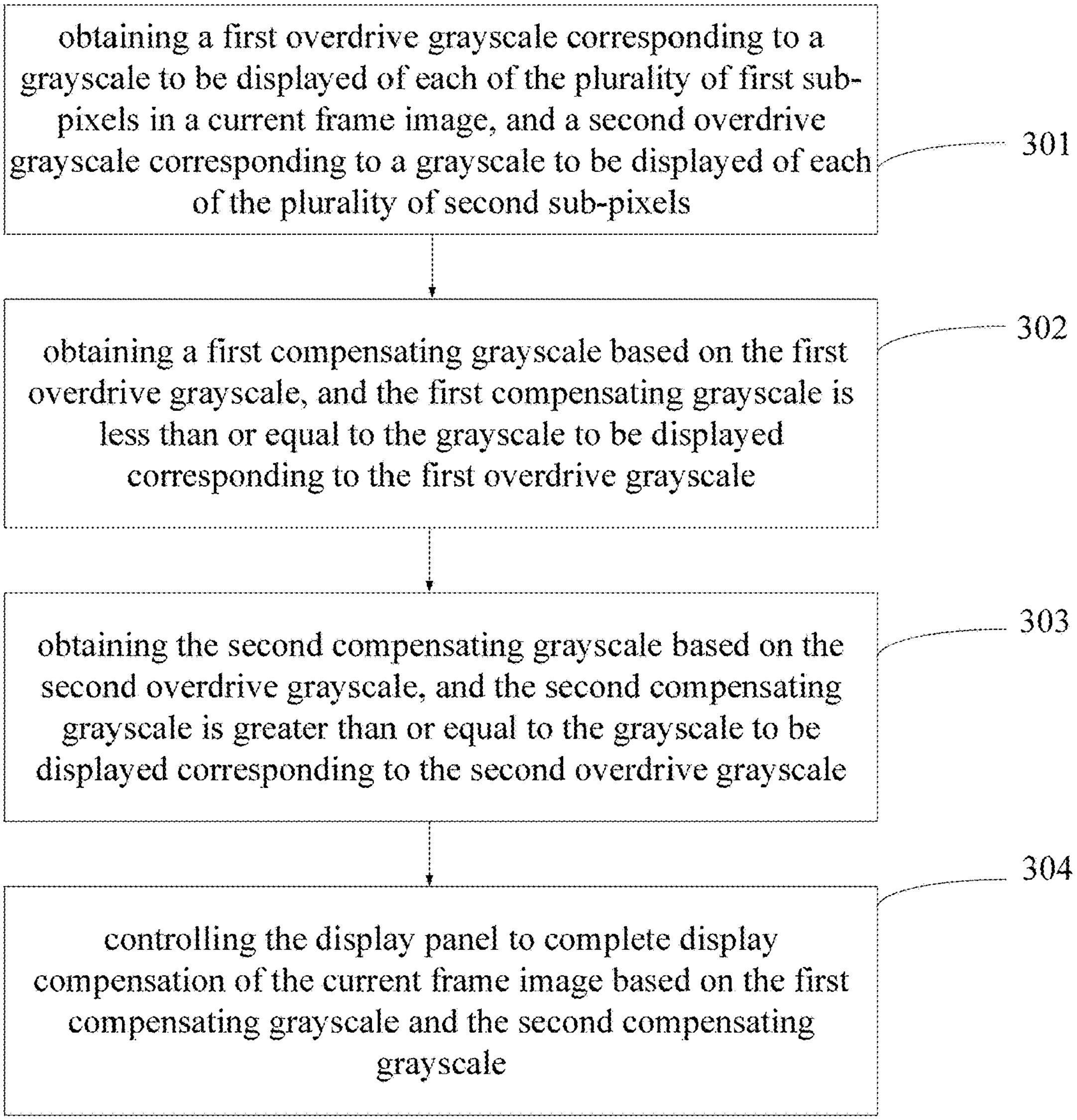
FIG. 3 is a schematic diagram of the overall flow of a display compensation method of a display panel in an embodiment of the present disclosure.

Referring to FIG. 3, FIG. 3 illustrates the overall flow of the display compensation method of the display panel according to the embodiment of the present disclosure. Specifically, the display compensation method includes the following steps.

Step 301: obtaining a first overdrive grayscale corresponding to a grayscale to be displayed of each of the plurality of first sub-pixels in a current frame image, and a second overdrive grayscale corresponding to a grayscale to be displayed of each of the plurality of second sub-pixels.

Exemplarily, the current frame image can be a secondary color image, and the RGB grayscale of the secondary color image is in the form of (k, z, z) or (z, z, k). The current frame image can also be a solid color image or a mixed color image of any other colors, and it is not specifically limited herein.

In some embodiments, step 301 can be implemented through the following manners.

Step one: obtaining a line overdrive compensation table of the display panel at the target refresh rate.

The line overdrive compensation table is the LOD compensation table. Taking 256 grayscales as an example, the exemplary form of the LOD compensation table is specifically shown in table 1 below.

TABLE 1

| Exemplary form of a LOD compensation table | | | | | | | | | | |
|---|---|---|---|---|---|---|---|---|---|---|
| | | grayscales in the previous row | | | | | | | | |
| LOD | | 0 | 32 | 64 | 96 | 128 | 160 | 192 | 224 | 255 |
| grayscales | 0 | 0 | 0 | 0 | 0 | 0 | 0 | 0 | 0 | 0 |
| in the | 32 | 32 | 32 | 32 | 32 | 32 | 32 | 32 | 32 | 32 |
| current row | 64 | 64 | 64 | 64 | 64 | 64 | 64 | 64 | 64 | 64 |
| | 96 | 96 | 96 | 96 | 96 | 96 | 96 | 96 | 96 | 96 |
| | 128 | 128 | 128 | 128 | 128 | 128 | 128 | 128 | 128 | 128 |
| | 160 | 160 | 160 | 160 | 160 | 160 | 160 | 160 | 160 | 160 |
| | 192 | 192 | 192 | 192 | 192 | 192 | 192 | 192 | 192 | 192 |
| | 224 | 224 | 224 | 224 | 224 | 224 | 224 | 224 | 224 | 224 |
| | 255 | 255 | 255 | 255 | 255 | 255 | 255 | 255 | 255 | 255 |

Exemplarily, different refresh rates correspond to different line overdrive compensation tables. For example, for a display panel with a maximum refresh rate of 180 Hz, five LOD compensation tables can provided, which are corresponded to 180 Hz, 165 Hz, 144 Hz, 120 Hz and 60 Hz for debugging, respectively. During the debugging, the target position of the display panel (such as the center position) can be used as a benchmark. During actual use, if the refresh rate of the display panel is greater than or equal to 60 Hz and less than 90 Hz, the LOD compensation table corresponding to 60 Hz can be used. If the refresh rate of the display panel is greater than or equal to 90 Hz and less than 130 Hz, the LOD compensation table corresponding to 120 Hz can be used. The compensation table can be used according to the actual situation and is not specifically limited herein.

Step two: obtaining the first overdrive grayscale from the line overdrive compensation table based on the grayscale to be displayed of each of the plurality of first sub-pixels in the current frame image and the grayscale to be displayed of each sub-pixel in the previous row of the plurality of first sub-pixels.

Step three: obtaining the second overdrive grayscale from the line overdrive compensation table based on the grayscale to be displayed of each of the plurality of second sub-pixels in the current frame image and the grayscale to be displayed of each sub-pixel in the previous row of the plurality of second sub-pixels.

Specifically, the LOD compensation table can be effective for the full screen of the display panel, that is to say, the entire display panel uses this LOD compensation table to find the overdrive grayscale. It can be understood that the grayscale to be displayed of each of the plurality of first sub-pixels and the grayscale to be displayed of each of the plurality of second sub-pixels may be the same or different. The first overdrive grayscale and the second overdrive grayscale may be the same or different.

For example, if the grayscale to be displayed of each of the plurality of first sub-pixels and the grayscale to be displayed of each of the plurality of second sub-pixels are both grayscale 64, and each of the grayscales to be displayed of each of the adjacent previous row of sub-pixels is grayscale 0, then it can be found that each of the first overdrive grayscale and the second overdrive grayscale is grayscale 68 by looking for the LOD compensation table. It can be understood that since each of the first sub-pixels is in an overcharged state, the second overdrive grayscale cannot improve the charging state of the first sub-pixel at this time. Therefore, it is necessary to depend on the method of the embodiment of the present disclosure to further perform multiple compensation, which can be referred to the relevant discussion of subsequent embodiments for detail.

Step 302: obtaining a first compensating grayscale based on the first overdrive grayscale, and the first compensating grayscale is less than or equal to the grayscale to be displayed corresponding to the first overdrive grayscale.

In some embodiments, taking the charging state of each of the plurality of first sub-pixels of the first partition is an overcharged state at the target refresh rate as an example, step 302 may be implemented through the following manners:

performing negative compensation on the first overdrive grayscale to obtain the first compensating grayscale.

In some examples, negative compensation of the first overdrive grayscale can be performed through the following steps to obtain the first compensating grayscale.

Step one: obtaining a gain compensation table of the display panel, the gain compensation table includes a first gain value Gain corresponding to each of the first partitions, and the first gain value Gain satisfies: $Gain_1<0$.

Specifically, the first gain value $Gain_1$ is configured to represent the grayscale compensation multiple of the corresponding first partition.

In some examples, the first gain value Gain can satisfy: $-2 \le Gain_1 < 0$. Exemplarily, the first gain value Gain is any one of or a range value between any two of −2, −1.9, −1.8, −1.7, −1.6, −1.5, −1.4, −1.3, −1.2, −1.1, −1.0, −0.9, −0.8, 0.7, −0.6, −0.5, −0.4, −0.3, −0.2, −0.1.

Taking 256 grayscales as an example, the first gain value Gain can represent the grayscale compensation of −2 times by using −255, and represent the grayscale compensation of −1 times by using −128, and so on. Then the grayscale compensation multiple can be set to any integer value n between −255 and 0, and then the actual first gain value $Gain_1$ represented by n can be determined through $n/255\times2$. In addition, the first gain value Gain can also represent the grayscale compensation of −1 times by using −255, and the specific representing form is not limited herein.

Step two: obtaining the first compensating grayscale based on the grayscale to be displayed of each of the plurality of first sub-pixels, the first overdrive grayscale, and the first gain value $Gain_1$.

Specifically, the filling value difference $\Delta G$ can be obtained firstly based on the grayscale to be displayed $G_1$ of each of the plurality of first sub-pixels and the first overdrive grayscale $G_1'$; then the grayscale compensation value $\Delta G'$ is obtained based on the first gain value $Gain_1$ and the filling value difference $\Delta G$; finally, the first compensating grayscale $G_{11}$ is obtained based on the grayscale to be displayed $G_1$ of each of the plurality of first sub-pixels and the grayscale compensation value ΔG'.

Exemplarily, the first compensating grayscale $G_{11}$ can be obtained through the following formula (1):

$$G_{11} = G_1 + \Delta G' = G_1 + \Delta G \times \text{Gain}_1 = G_1 + (G_1' - G_1) \times \text{Gain}_1; \quad (1)$$

step 303: obtaining the second compensating grayscale based on the second overdrive grayscale, and the second compensating grayscale is greater than or equal to the grayscale to be displayed corresponding to the second overdrive grayscale.

In some embodiments, it is taken as an example that the charging state of each of the plurality of second sub-pixels of the second partition is an undercharged state at the target refresh rate, step 303 may be implemented through the following manners:

performing positive compensation on the second overdrive grayscale to obtain the second compensating grayscale.

In some examples, positive compensation of the second overdrive grayscale can be performed through the following steps to obtain the second compensating grayscale.

Step one: obtaining the gain compensation table of the display panel, the gain compensation table can further include a second gain value $\text{Gain}_2$ corresponding to each of the second partitions, and the second gain value $\text{Gain}_2$ satisfies: $0<\text{Gain}_2$.

Specifically, the second gain value $\text{Gain}_2$ is configured to represent the grayscale compensating multiple of the corresponding second partition.

In some examples, the second gain value $\text{Gain}_2$ can satisfy: $0<\text{Gain}_2\leq 2$. Exemplarily, the second gain value $\text{Gain}_2$ is any one of or a range value between any two of 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1.

Taking 256 grayscales as an example, the second gain value $\text{Gain}_2$ can represent the grayscale compensation of 2 times by using 255, and represent the grayscale compensation of 1 times by using 128, and so on. Then the grayscale compensating multiple can be set to any integer value n between 0 and 255, and then the actual second gain value $\text{Gain}_2$ represented by n can be determined by n/255×2. In addition, the second gain value $\text{Gain}_2$ can also represent the grayscale compensation of 1 times by using 255, and the specific representation form is not limited herein.

It can be understood that the gain compensation table of the display panel in the embodiment of the present disclosure includes the gain value of each partition. Taking 256 grayscales and 4×8 partitions as an example, the exemplary form of the gain compensation table can be referred to table 2 below in detail.

TABLE 2

Exemplary form of a gain compensation table

| Gain | x1 | x2 | x3 | x4 |
|---|---|---|---|---|
| y1 | 128 | 128 | 128 | 128 |
| y2 | 128 | 128 | 128 | 128 |
| y3 | 128 | 128 | 128 | 128 |
| y4 | 128 | 128 | 128 | 128 |
| y5 | 128 | 128 | 128 | 128 |
| y6 | 128 | 128 | 128 | 128 |
| y7 | −128 | −128 | −128 | −128 |
| y8 | −128 | −128 | −128 | −128 |

In table 2, Gain represents the gain value, x1 to x4 represent the length of 4×8 partitions along the row direction X of the display panel, y1 to y8 represent the width of 4×8 partitions along the column direction Y of the display panel. The gain value Gain of each partition can be debugged respectively based on the target position of the corresponding partition.

In the gain compensation table of the embodiment of the present disclosure, before the development of the display panel product, and when selecting the model of the timing controller (Tcon), the gain value Gain can expand the value range by changing the hardware compensation circuit in the timing controller. That is, $0\leq\text{Gain}\leq M$ is optimized to $-N\leq\text{Gain}\leq M$, wherein M and N are both positive numbers. Exemplarily, M and N can both be 1 or both be 2, that is, the value range of the Gain can be set to be −1 times to +1 times, or the value range can also be set to be −2 times to +2 times.

The value range of the gain value Gain is optimized through the above method, so that the gain value of each partition can be adjusted according to actual requirements when debugging the gain compensation table. Compared with the gain value with only positive values, the above method can better improve the situation in which the charging states of different partitions are different at the target refresh rate, and thus improving debugging efficiency and shortening the code debugging schedule. In addition, there is no need to introduce a new IP (Intellectual Property, that is, a general term for integrated circuit cores with intellectual property cores) module in the timing controller, which will not affect other parameters, and while changes in the value range of the gain value Gain will not increase the amount of data storage, so that the overall cost of the product is not affected.

Step two: obtaining the second compensating grayscale based on the grayscale to be displayed of each of the plurality of second sub-pixels, the second overdrive grayscale, and the second gain value $\text{Gain}_2$.

Specifically, the filling value difference ΔG can be obtained firstly based on the grayscale to be displayed $G_2$ of each of the plurality of second sub-pixels and the second overdrive grayscale $G_2$'; then the grayscale compensation value ΔG' is obtained based on the second gain value $\text{Gain}_2$ and the filling value difference ΔG; and finally, the second compensating grayscale G22 is obtained based on the grayscale to be displayed $G_2$ of each of the plurality of second sub-pixels and the grayscale compensation value ΔG'.

Exemplarily, the second compensating grayscale G22 can be obtained through the following formula (2):

$$G_{22} = G_2 + \Delta G' = G_2 + \Delta G \times \text{Gain}_2 = G_2 + (G_2' - G_2) \times \text{Gain}_2; \quad (2)$$

In some examples, in addition to the above step 302 and step 303, in a case where the display panel further includes a third partition, the display compensation method of the embodiment of the present disclosure may further include:

obtaining the third overdrive grayscale corresponding to the grayscale to be displayed of each sub-pixel in the third partition under the current frame image, and obtaining the third compensating grayscale based on the third overdrive grayscale. The gain value Gain corresponding to the third partition can be 0, then the grayscale compensation value ΔG' is 0, and the third compensating grayscale is equal to the grayscale to be displayed of the corresponding sub-pixel in the third partition.

Step 304: controlling the display panel to complete display compensation of the current frame image based on the first compensating grayscale and the second compensating grayscale.

Specifically, the display panel is controlled to actually display the first compensating grayscale and the second compensating grayscale, so as to present the current frame image with corrected display effect.

It can be understood that the display compensation method of the display panel in the embodiment of the present disclosure optimizes the value range of each gain value in the gain compensation table, so that when the LOD compensation table effective in the full screen and the gain compensation table effective in different partitions work together, negative compensation for overcharged partitions and positive compensation for undercharged partitions under the same screen image can be achieved. Therefore, the charging effect of the full screen can be taken into account, the inconsistent charging states of different partitions at the target refresh rate can be simply and efficiently improved, and thus significantly improving the display effect.

Figure 4:
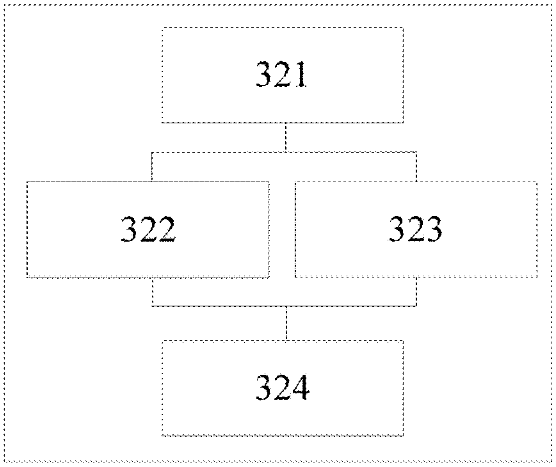
FIG. 4 is a schematic diagram of a structure of a display compensation device of a display panel in an embodiment of the present disclosure.

Correspondingly, referring to FIG. 4, FIG. 4 is a diagram of a structure of a display compensation device of a display panel in an embodiment of the present disclosure. The display panel to which the display compensation device 32 provided by an embodiment of the present disclosure is applied includes at least one first partition and at least one second partition spaced apart, each of the at least one first partition includes a plurality of first sub-pixels, and each of the at least one second partition includes a plurality of second sub-pixels; and the display compensation device 32 specifically includes: a first obtaining module 321, a second obtaining module 322, a third obtaining module 323 and a display driving module 324.

The first obtaining module 321 is configured to obtain a first overdrive grayscale corresponding to a grayscale to be displayed of each of the plurality of first sub-pixels in a current frame image, and a second overdrive grayscale corresponding to a grayscale to be displayed of each of the plurality of second sub-pixels.

The second obtaining module 322 is configured to obtain a first compensating grayscale based on the first overdrive grayscale, and the first compensating grayscale is less than or equal to the grayscale to be displayed corresponding to the first overdrive grayscale.

The third obtaining module 323 is configured to obtain a second compensating grayscale based on the second overdrive grayscale, and the second compensating grayscale is greater than or equal to the grayscale to be displayed corresponding to the second overdrive grayscale.

The display driving module 324 is configured to control the display panel to complete display compensation of the current frame image based on the first compensating grayscale and the second compensating grayscale.

In some embodiments, a charging state of each of the plurality of first sub-pixels at a target refresh rate is a first state, and the first state is configured such that a relationship between an actual brightness $L_1$ and a standard brightness $L_0$ satisfies $L_0<L_1$; and a charging state of each of the plurality of second sub-pixels at the target refresh rate is a second state, and the second state is configured such that the relationship between the actual brightness $L_1$ and the standard brightness $L_0$ satisfies $L_1<L_0$.

In some embodiments, the second obtaining module 322 is specifically configured to:

perform negative compensation on the first overdrive grayscale to obtain the first compensating grayscale; and the third obtaining module 323 is specifically configured to:

perform positive compensation on the second overdrive grayscale to obtain the second compensating grayscale.

In some embodiments, the second obtaining module 322 is specifically configured to:

obtain a gain compensation table of the display panel, the gain compensation table includes a first gain value $Gain_1$ corresponding to each of the at least one first partition, and the first gain value $Gain_1$ satisfies: $Gain_1<0$; and obtain the first compensating grayscale based on the grayscale to be displayed of each of the plurality of first sub-pixels, the first overdrive grayscale, and the first gain value $Gain_1$.

In some embodiments, the first gain value $Gain_1$ satisfies: $-2 \leq Gain_1<0$.

In some embodiments, the second obtaining module 322 is specifically configured to:

obtain the filling value difference based on the grayscale to be displayed of each of the plurality of first sub-pixels and the first overdrive grayscale;

obtain the grayscale compensation value based on the first gain value $Gain_1$ and the filling value difference; and obtain the first compensating grayscale based on the grayscale to be displayed of each of the plurality of first sub-pixels and the grayscale compensation value.

In some embodiments, the gain compensation table further includes a second gain value $Gain_2$ corresponding to each of the at least one second partition, and the second gain value $Gain_2$ satisfies: $0<Gain_2$; and the third obtaining module 323 is specifically configured to:

obtain the second compensating grayscale based on the grayscale to be displayed of each of the plurality of second sub-pixels, the second overdrive grayscale, and the second gain value $Gain_2$.

In some embodiments, the second gain value $Gain_2$ satisfies: $0<Gain_2 \leq 2$.

In some embodiments, the first obtaining module 321 is specifically configured to:

obtain a line overdrive compensation table of the display panel at the target refresh rate;

obtain the first overdrive grayscale from the line overdrive compensation table based on the grayscale to be displayed of each of the plurality of first sub-pixels in the current frame image and the grayscale to be displayed of each sub-pixel in a previous row of the plurality of first sub-pixels; and obtain the second overdrive grayscale from the line overdrive compensation table based on the grayscale to be displayed of each of the plurality of second sub-pixels in the current frame image and the grayscale to be displayed of each sub-pixel in a previous row of the plurality of second sub-pixels.

It can be understood that the display compensation device 32 of the display panel in the embodiment of the present disclosure can perform overdrive compensation in different directions on the partitions of the first sub-pixels and the second sub-pixels with different charging states under the same screen image, so as to take into account the charging states of the full screen, and thus significantly alleviating the horizontal stripe and improving the display effect.

The display compensation method of a display panel and the display device provided by the embodiments of the present disclosure are introduced in detail in the above, and specific examples are used herein to illustrate the principles and implementations of the present disclosure. The description of the above embodiments is only intended to help to understand methods and core ideas of the present disclosure. It should be understood that, a person skilled in the art may modify the technical solutions recorded in the foregoing embodiments, or to equivalently replace some of the technical features. However, these modifications or replacements do not cause the essence of the corresponding technical solution to depart from the scope of the technical solution of each embodiment of the present disclosure.

What is claimed is:

1. A display compensation method of a display panel, wherein the display panel comprises at least one first partition and at least one second partition spaced apart, each of the at least one first partition comprises a plurality of first sub-pixels, each of the at least one second partition comprises a plurality of second sub-pixels, and the display compensation method comprises:

obtaining a first overdrive grayscale corresponding to a grayscale to be displayed of each of the plurality of first sub-pixels in a current frame image, and a second overdrive grayscale corresponding to a grayscale to be displayed of each of the plurality of second sub-pixels;

obtaining a first compensating grayscale based on the first overdrive grayscale, and the first compensating grayscale is less than or equal to the grayscale to be displayed corresponding to the first overdrive grayscale;

obtaining a second compensating grayscale based on the second overdrive grayscale, and the second compensating grayscale is greater than or equal to the grayscale to be displayed corresponding to the second overdrive grayscale; and controlling the display panel to complete display compensation of the current frame image based on the first compensating grayscale and the second compensating grayscale;

wherein a first condition is defined by the first compensating grayscale being equal to the grayscale to be displayed corresponding to the first overdrive grayscale, and a second condition is defined by the second compensating grayscale being equal to the grayscale to be displayed corresponding to the second overdrive grayscale;

wherein the first condition and the second condition do not coexist simultaneously.

2. The display compensation method of the display panel according to claim 1, wherein a charging state of each of the plurality of first sub-pixels at a target refresh rate is a first state, and the first state is configured such that a relationship between an actual brightness $L_1$ and a standard brightness $L_0$ satisfies $L_0<L_1$; and a charging state of each of the plurality of second sub-pixels at the target refresh rate is a second state, and the second state is configured such that the relationship between the actual brightness $L_1$ and the standard brightness $L_0$ satisfies $L_1<L_0$.

3. The display compensation method of the display panel according to claim 2, wherein obtaining the first compensating grayscale and the second compensating grayscale comprises:

performing negative compensation on the first overdrive grayscale to obtain the first compensating grayscale; and performing positive compensation on the second overdrive grayscale to obtain the second compensating grayscale.

4. The display compensation method of the display panel according to claim 3, wherein performing the negative compensation on the first overdrive grayscale to obtain the first compensating grayscale comprises:

obtaining a gain compensation table of the display panel, the gain compensation table comprises a first gain value $Gain_1$ corresponding to each of the at least one first partition, and the first gain value $Gain_1$ satisfies: $Gain_1<0$; and obtaining the first compensating grayscale based on the grayscale to be displayed of each of the plurality of first sub-pixels, the first overdrive grayscale, and the first gain value $Gain_1$.

5. The display compensation method of the display panel according to claim 4, wherein the gain compensation table further comprises a second gain value $Gain_2$ corresponding to each of the at least one second partition, and the second gain value $Gain_2$ satisfies: $0<Gain_2$; and performing the positive compensation on the second overdrive grayscale to obtain the second compensating grayscale comprises:

obtaining the second compensating grayscale based on the grayscale to be displayed of each of the plurality of second sub-pixels, the second overdrive grayscale, and the second gain value $Gain_2$.

6. The display compensation method of the display panel according to claim 5, wherein the second gain value $Gain_2$ satisfies: $0<Gain_2\leq 2$.

7. The display compensation method of the display panel according to claim 5, wherein obtaining the second compensating grayscale based on the grayscale to be displayed of each of the plurality of second sub-pixels, the second overdrive grayscale, and the second gain value $Gain_2$ comprises:

obtaining a filling value difference based on the grayscale to be displayed of each of the plurality of second sub-pixels and the second overdrive grayscale;

obtaining a grayscale compensation value based on the second gain value $Gain_2$ and the filling value difference; and obtaining the second compensating grayscale based on the grayscale to be displayed of each of the plurality of second sub-pixels and the grayscale compensation value.

8. The display compensation method of the display panel according to claim 4, wherein the first gain value $Gain_1$ satisfies: $-2\leq Gain_1<0$.

9. The display compensation method of the display panel according to claim 4, wherein obtaining the first compensating grayscale based on the grayscale to be displayed of each of the plurality of first sub-pixels, the first overdrive grayscale, and the first gain value $Gain_1$ comprises:

obtaining a filling value difference based on the grayscale to be displayed of each of the plurality of first sub-pixels and the first overdrive grayscale;

obtaining a grayscale compensation value based on the first gain value $Gain_1$ and the filling value difference; and obtaining the first compensating grayscale based on the grayscale to be displayed of each of the plurality of first sub-pixels and the grayscale compensation value.

10. The display compensation method of the display panel according to claim 2, wherein the display panel further comprises a third partition, the third partition is located between the at least one first partition and the at least one second partition; and a charging state of each sub-pixel in the third partition at the target refresh rate is a third state, and the third state is configured such that the relationship between the actual brightness $L_1$ and the standard brightness $L_0$ satisfies $L_0=L_1$.

11. The display compensation method of the display panel according to claim 10, wherein the display compensation method further comprises:

obtaining a third overdrive grayscale corresponding to a grayscale to be displayed of each sub-pixel in the third partition in the current frame image, and obtaining a third compensating grayscale based on the third overdrive grayscale.

12. The display compensation method of the display panel according to claim 1, wherein obtaining the first overdrive grayscale and the second overdrive grayscale comprises:

obtaining a line overdrive compensation table of the display panel at a target refresh rate;

obtaining the first overdrive grayscale from the line overdrive compensation table based on the grayscale to be displayed of each of the plurality of first sub-pixels in the current frame image and a grayscale to be displayed of each sub-pixel in a previous row of the plurality of first sub-pixels; and obtaining the second overdrive grayscale from the line overdrive compensation table based on the grayscale to be displayed of each of the plurality of second sub-pixels in the current frame image and a grayscale to be displayed of each sub-pixel in a previous row of the plurality of second sub-pixels.

13. The display compensation method of the display panel according to claim 1, wherein controlling the display panel to complete display compensation of the current frame image based on the first compensating grayscale and the second compensating grayscale comprises:

controlling the display panel to actually display the first compensating grayscale and the second compensating grayscale.

14. A display panel, wherein the display panel comprises at least one first partition, each of the at least one first partition comprises a plurality of first sub-pixels, and a charging state of each of the plurality of first sub-pixels at a target refresh rate is a first state, and the first state is configured such that a relationship between an actual brightness $L_1$ and a standard brightness $L_0$ satisfies $L_0<L_1$; and the display panel comprises:

a timing controller, wherein the timing controller comprises a storage unit, the storage unit is configured to store a gain compensation table, the gain compensation table comprises a first gain value $Gain_1$ corresponding to each of the at least one first partition, and the first gain value $Gain_1$ satisfies: $Gain_1<0$.

15. The display panel according to claim 14, the display panel further comprises at least one second partition spaced apart from the at least one first partition, each of the at least one second partition comprises a plurality of second sub-pixels, a charging state of each of the plurality of second sub-pixels at the target refresh rate is a second state, and the second state is configured such that the relationship between actual brightness $L_1$ and standard brightness $L_0$ satisfies $L_1<L_0$; and the gain compensation table further comprises a second gain value $Gain_2$ corresponding to each of the at least one second partition, and the second gain value $Gain_2$ satisfies: $0<Gain_2$.

16. The display panel according to claim 15, wherein the second gain value $Gain_2$ satisfies:

$$0 < Gain_2 \leq 2.$$

17. The display panel according to claim 14, wherein the first gain value $Gain_1$ satisfies: $-2\leq Gain_1<0$.

18. A display compensation device of a display panel, wherein the display panel comprises at least one first partition and at least one second partition spaced apart, each of the at least one first partition comprises a plurality of first sub-pixels, each of the at least one second partition comprises a plurality of second sub-pixels, and the display compensation device comprises a hardware compensation circuit, wherein the hardware compensation circuit is configured to:

obtain a first overdrive grayscale corresponding to a grayscale to be displayed of each of the plurality of first sub-pixels in a current frame image, and a second overdrive grayscale corresponding to a grayscale to be displayed of each of the plurality of second sub-pixels;

obtain a first compensating grayscale based on the first overdrive grayscale, and the first compensating grayscale is less than or equal to the grayscale to be displayed corresponding to the first overdrive grayscale;

obtain a second compensating grayscale based on the second overdrive grayscale, and the second compensating grayscale is greater than or equal to the grayscale to be displayed corresponding to the second overdrive grayscale; and control the display panel to complete display compensation of the current frame image based on the first compensating grayscale and the second compensating grayscale;

wherein a first condition is defined by the first compensating grayscale being equal to the grayscale to be displayed corresponding to the first overdrive grayscale, and a second condition is defined by the second compensating grayscale being equal to the grayscale to be displayed corresponding to the second overdrive grayscale;

wherein the first condition and the second condition do not coexist simultaneously.

19. The display compensation device of the display panel according to claim 18, wherein a charging state of each of the plurality of first sub-pixels at a target refresh rate is a first state, and the first state is configured such that a relationship between an actual brightness $L_1$ and a standard brightness $L_0$ satisfies $L_0<L_1$; and a charging state of each of the plurality of second sub-pixels at the target refresh rate is a second state, and the second state is configured such that the relationship between the actual brightness $L_1$ and the standard brightness $L_0$ satisfies $L_1<L_0$.

20. The display compensation device of the display panel according to claim 19, wherein the hardware compensation circuit is further configured to:

perform negative compensation on the first overdrive grayscale to obtain the first compensating grayscale, and perform positive compensation on the second overdrive grayscale to obtain the second compensating grayscale.

* * * * *